United States Patent [19]

Odom

[11] Patent Number: 5,648,258

[45] Date of Patent: Jul. 15, 1997

[54] ANTHRAQUINONE INHIBITION OF METHANE PRODUCTION IN A RUMINANT ANIMAL

[75] Inventor: James Martin Odom, Avondale, Pa.

[73] Assignee: Bio-Technical Resources, Manitowoc, Wis.

[21] Appl. No.: 436,378

[22] PCT Filed: Oct. 20, 1993

[86] PCT No.: PCT/US93/09806

§ 371 Date: Jul. 24, 1995

§ 102(e) Date: Jul. 24, 1995

[87] PCT Pub. No.: WO94/08738

PCT Pub. Date: Apr. 28, 1994

[51] Int. Cl.$^6$ ............... A23K 1/18; C12N 1/20; C07C 50/16
[52] U.S. Cl. ............... 435/252.1; 424/282.1; 426/807; 552/208; 552/210
[58] Field of Search ............... 435/252.1; 424/282.1; 426/807; 552/208, 210

[56] References Cited

U.S. PATENT DOCUMENTS 5,039,707  8/1991  Mobley ............... 514/680

FOREIGN PATENT DOCUMENTS

0430164A2  6/1991  European Pat. Off. .
614466  11/1979  Switzerland .

OTHER PUBLICATIONS

C.J. Van Nevel and D.L. Demeyer, Manipulation of rumin fermentation, In: *The Rumin Microbial Ecosystem*, R.N. Hobson (ed) Elsevier Publishing Co., 1988.
Anchel, J., *Biol. Chem.*, 177, 169–177, 1949.
Kavanaugh, *J. Bacteriol*, 54, 761–767, 1947.
Anke, et al, *Arch. Microbiol.*, 126, 223–230, 1980.
Anke, et al, *Arch Microbiol.*, 126, 231–236, 1980.
Fuzellier, et al, *Ann. Pharm., Fr.,*, 39(4), 313–318, 1981.
Haran, et al, *Isr. J. Med. Sci.*, 17(6), 485–496, 1981.
Boos, et al, *FEBS Lett.*, 127, 40–44, 1981.
Shcherbanoviskii, et al, *Rastit. Resur.*, 11(3) 445–454, 1975.
Brown, et al, *Mutation Research*, 40, 203–224, 1976.
Renand, P., Dochain, D., Bostin, G., Maveau, H., Nyns, B.J., "Adaptive Control of Anacrobic Digestinc Processes: A Pilot Scale Application", Biotechnol. Bioeng., 31, 287–294, 1988.
Peck, et al, "Anaerobic Tumentations of Cellulose to Mettane", Trends in the Biology of Fermentations for Fueld and Chemicals, 1981, ed Hollaender et al, Plenum Publishing.
Crutzen, et al, Tellico 38B, 1986, 3–4 pp. 271–283.
Nelimans, Pharmacology, 14 (Suppl. 1) p. 73.
Slyter, Appl. And Env. Micor, vol. 37 No. 2 Feb. 1979 pp. 283–288.
Liberman, et al, Appl. And Env. Micro., vol. 43, No. 6, Jun. 1982, pp. 1354–1359.
Brown, et al, Biochemical Society Transaction, vol. 5, 570th Meeting, pp. 1489–1492 (1977).
Patel, et al, "Antibacterial Activity of Cassia Fora and Cassia Obarato", pp. 70–73, 1956.
Balch, et al, Micro Reviews, vol. 43, No. 2, pp. 260–296. Jun. 1979.
"Applied and Environmental Microbiology", vol. 55, No. 2, Feb. 1989.
Battersby, et al, "Survey of the Anaerobic Biodegradation Petential of Organic Chemicals in Digesting Sludge", Applied and Environmental Microbiology, Feb. 1989, pp. 433–439.

*Primary Examiner*—John W. Rollins
*Assistant Examiner*—Deborah Ware

[57] ABSTRACT

Anthraquinone compounds inhibit methane production by methanogenic bacteria in the rumen of ruminant animals, increasing production of volatile fatty acids and feed utilization efficiency. Preferred anthraquinones are unsubstituted anthraquinone, 1-aminoanthraquinone, 1-chloroanthraquinone, 2-chloroanthraquinone, 2-chloro-3-carboxyanthraquinone, 1-hydroxyanthraquinone, and 9,10-dihydroanthraquinone.

15 Claims, No Drawings

ANTHRAQUINONE INHIBITION OF METHANE PRODUCTION IN A RUMINANT ANIMAL

FIELD OF INVENTION

The invention relates to the use of anthraquinones as inhibitors of methane production in methanogenic bacteria.

BACKGROUND OF THE INVENTION

Regulation of methane production by methanogenic bacteria has several important agronomic and environmental utilities. It has long been recognized that the regulation of methane production in cattle rumen has affected the efficiency with which cattle produce milk and beef from feedstocks. Additionally, there has been renewed environmental interest in the regulation of methane as a major greenhouse gas.

Microbial methane formation is a strictly anaerobic process which is carried out by a metabolically unique group of organisms generally known as the methanogenic bacteria. The group comprises the genera Methanococcus, Methanobacterium, Methanosarcina, Methanobrevibacter, Methanothermus, Methanothrix, Methanospirillum, Methanomicrobium, Methanococcoides, Methanogenium, and Methanoplanus. These bacteria are widely distributed in strictly anaerobic habitats including the rumen of ruminant animals, the termite gut, landfills, stagnant ponds, anaerobic digestors and rice paddies. The temperature range for growth may range from mesophilic temperatures up to extremely thermophilic temperatures.

The methanogens are highly interactive ecologically, and depend heavily on the metabolism of other bacteria to produce the substrates needed for their survival. Fermentative bacteria provide these substrates by conversion of complex macromolecules such as cellulose or protein into four principal methanogenic substrates: hydrogen, carbon dioxide, acetic acid, and formic acid. The methanogens then remove these fermentative end-products and convert them into gaseous methane and carbon dioxide.

The classic example of this type of association is termed "interspecies hydrogen transfer" wherein a hydrogen-producing organism generates hydrogen for the methanogen, and the methanogen then removes hydrogen which is actually inhibitory for the hydrogen producer. This is seen in the natural food chain where primary bacteria convert cellulose to various products including lactate, acetate, fatty acids, carbon dioxide and hydrogen, and the methanogens then utilize the hydrogen and carbon dioxide to produce methane and water.

In marine or brackish waters where sulfate is abundant, cellulose is converted to carbon dioxide and hydrogen sulfide by sulfate reducing bacteria (SRB). These bacteria have a parallel metabolism to the methanogens and are able to utilize hydrogen and sulfate to produce hydrogen sulfide. In sewage treatment facilities and in freshwater bogs where sulfate concentrations are low, the SRB enter into a symbiotic relationship with the methanogens wherein the SRB produce hydrogen from organic acids and alcohols. The methanogens in turn convert the hydrogen to methane and carbon dioxide.

Even though methanogens are typically grown in the laboratory under an 80%/20% (vol/vol) hydrogen/carbon dioxide, in natural environments methanogens and SRB are exposed to and grow on only traces of hydrogen and carbon dioxide. The intermediary levels of hydrogen, carbon dioxide and acetate may be very low but the methanogens and sulfate-reducers are able to grow on these substrates liberated by the fermentation of sugars, organic acids (i.e., lactate, fatty acids) and alcohols.

There are at least two important utilities for inhibitors of methanogenesis. The first is the chemical manipulation of rumen fermentation as it occurs in ruminant animals such as cows and sheep, to divert microbial rumen metabolism away from methane formation and toward volatile fatty acid formation. Methane represents a caloric loss to the ruminant of 5–10% of its total caloric intake, and diversion of this energy into volatile fatty acids which the ruminant would use for nutrition would increase the efficiency of conversion of feedstocks into beef. An inverse relationship between methane formation and production of the volatile fatty acid, propionate, has been demonstrated by many investigators, and therefore a positive effect of a methane inhibitor on rumen nutrition is expected. (C. J. Van Nevel, D. I. Demeyer, Manipulation of rumen fermentation. In: The Rumen Microbial Ecosystem, P. N. Hobson. (ed) Elsevier Publishing Co. (1988).)

Another important application of the inhibition of methane formation would be a decrease in production of a major greenhouse gas and atmospheric pollutant.

Although methane constitutes only 0.4% of all greenhouse pollutants, it contributes 18% of the total greenhouse warming of the earth's atmosphere, and its annual rate of increase is on the order of 1%. Some of the primary sources of environmental methane come from domestic animals, landfills, and rice cultivation; which together contribute over 40% of the total methane emissions and over 60% of the anthropogenic methane emissions. Methane emissions from rice cultivation are estimated to contribute about 20% of the total methane produced in the atmosphere, and emissions form landfills constitute about 7% of the total emissions. With respect to animal methane production, cattle are the ruminants primarily responsible for the largest methane emissions. The average dairy cow may produce 200 liters of methane per day. The U.S. herd alone produces over 5 million metric tons of methane per year. Thus, the agricultural and industrial activities of man have become a significant contributor to the total methane emission into the earth's atmosphere.

Methanogen inhibitors have been developed previously, primarily for use as feedstock additives to increase ruminant efficiency. Such additives fall primarily into two classes. The first group are compounds which indirectly affect methane formation by interfering with carbon or electron flow at a point upstream of the methanogen in the microbial food chain. The second group affects methanogens directly. Examples of compounds known to inhibit methanogenesis directly or indirectly are diverse, and range from common anions such as nitrate, to ionopore antibiotics. Specific examples include monesin, lasalocid, salinomycin, avoparcin, aridcin, actaplanin, penicillin, chlorine and bromine methane analogs, long chain fatty acids, sulfate and nitrate. A complete list is cited in C. J. Van Nevel, D. I. Demeyer, Manipulation of Rumen Fermentation, In: The Rumen Microbial Ecosystem, P. N. Hobson (ed) Elsevier Publishing Co. (1988) hereby incorporated by reference. Clearly most, if not all, of these compounds lack specificity for methane formation, and some exhibit a multitude of side effects in the rumen of animals.

Numerous patents have been granted on a variety of compounds claiming to directly or indirectly inhibit methane formation in ruminant animals. It is believed that none, however, disclose use of anthracquinones as inhibitors of methane production.

The biological activities of anthraquinones are multitudinous and the utility of these compounds includes, for example, use as antimicrobials, proteolytic enzyme inhibitors, and as laxatives. The antimicrobial activity of anthraquinone plant extracts such as Cassia sp. has been long recognized. The active component of Cassia has been identified as 4,5 dihydroxyanthraquinone-2-carboxylic acid (Anchel, J. Biol. Chem., 177:169–177 (1949)). The existing literature, however, indicates that the general antimicrobial effects of anthraquinones appear to be sporadic and unpredictable with regard to the bacterial species and processes affected. Studies have shown, for example, that some gram positive bacterial species such as Bacillus or Staphylococcus are sensitive to anthraquinone, but that gram negative bacteria such as Escherichia sp. or Pseudomonas sp. are insensitive (Kavanaugh, J. Bacteriol., 54:761–767 (1947)). However, other studies have shown that the 1,4,6,8 tetrahydroxyanthraquinone does not inhibit all strains of Bacillus, and that in Nocardia (gram positive) only one strain out of four is effected. The compound has no demonstrated effect on *Escherichia coli*, Pseudomonas sp., Salmonella sp. or Sarcina sp. (Anke et al., Arch. Microbiol., 126:223–230 (1980); Anke et al., Arch. Microbiol., 126:231–236 (1980)). Metal Chelates of the 1,8 dihydroxyanthraquinone were shown to be active against *Bacillus subtilis, Bacillus stearothermophilus* and Staphylococcus aureus whereas the 1,2 dihydroxyanthraquinone and the 1-amino-4-hydroxyanthraquinone were generally inactive against these strains. The anthraquinones aloe-emodin and Rhein were found to be inhibitory to *Bacillus subtilis* and *Staphylococcus aureus*. However, the related anthraquinone, Chrysophanol, was not inhibitory to these strains. None of the anthraquinones tested inhibited the yeast Candida (Fuzellier et al., Ann. Pharm. Fr., 39(4) 313–318 (1981)). Diaminoanthraquinones were shown to exhibit toxicity against gram positive cocci but not gram negative bacteria (Haran et al., Isr. J. Med. Sci., 17(6): 485–496 (1981)). These results typify the sporadic and unpredicatable antimicrobial effects of the anthraquinones.

Swiss Patent No. 614,466 discloses that anthraquinones with substituent methyl, hydroxymethyl, carboxyl, aldehyde or carboxyethyl groups are known to inhibit bacterial growth in tissue culture and in other applications where eukaryotic growth is desirable, but bacterial growth is not.

The 1,3,6,8 tetrahydroxyanthraquinone has been claimed as producing a laxative effect by stimulation of the neuromuscular junction of the bowel wall (U.S. Pat. No. 5,039, 707).

Anthraquinones have also been shown to interfere with bacterial DNA metabolism (Anke et al., Arch. Microbiol., 126:231–236 (1980)); and to inhibit ADP transport into mitochondria (Boos et al., FEBS Lett., 127:40–44 (1981)). The chemical reaction of reduced anthraquinone with oxygen to produce toxic superoxide radical may also be an important toxicity mechanism (Shcherbanoviskii et al., Rastit. Resur., 11(3): 445–454 (1975)).

Miscellaneous inhibitory effects on particular enzyme systems have been reported, but the overall lack of toxicity of anthraquinones is supported by their natural occurrence in plants, their widespread use as vat dyes for clothing and their use until recently as laxatives. Pharmaceutical use of anthraquinones, particularly hydroxylated anthraquinones, has been curtailed due to the finding that they are weak mutagens. Halogenated anthraquinones, however, are not mutagenic (Brown et al., Mutation Research, 40:203–224 (1976)).

U.S. patent application Ser. No. 07/510,763, Pct publication No. 91/15954 discloses that a large number of anthraquinone derivatives inhibit respiratory sulfate-reduction from anaerobic sulfate-reducing bacteria. Further, it was shown that other growth modes within these bacteria were unaffected and that other bacterial types such as *Escherichia coli* and Saccharomyces sp. were unaffected by the preferred compounds. The preferred anthraquinones comprised halogenated as well as hydroxylated derivatives. These compounds were shown to inhibit sulfide production in all laboratory strains of sulfate-reducing bacteria, as well as crude sulfate-reducing enrichments from a variety of natural environments.

In summary, although it has been shown that anthraquinones possess a variety of rather specific biological properties, these compounds have never before been implicated as inhibitors of the methanogenic process. Use of these compounds fills a need, therefore, as inhibitors of methane production from methanogenic bacteria. Preferably, this inhibition should be generally non-toxic, and have the ability to inhibit methane production without significantly disrupting the natural equilibrium of the existing microbial population.

SUMMARY OF THE INVENTION

This invention provides a method of inhibiting methane production in methogenic bacteria comprising contacting a medium containing methanogenic bacteria with an anthraquinone compound. The methanogenic bacterial medium may be a mixed bacterial culture including, for example, other hydrogen-producing or acetate-producing bacterial strains. Preferably, the level of hydrogen present over the bacterial medium is less than about 5% by volume, and the anthraquinone compounds are present in the medium at a concentration of up to about 1 mg/liter.

The method of inhibiting methane production in methanogenic bacteria by addition of anthraquinone, is useful, for example, to decrease the methane production in subsurface environments such as landfills, in rice paddies, and in the rumen of ruminant animals. Such inhibition provides a method to reduce levels of a major greenhouse gas. This invention also provides a method to increase production of volatile fatty acids in ruminant animals, comprising feeding the ruminant animal an anthraquinone compound.

DETAILED DESCRIPTION OF THE INVENTION

The following terminology has been used by Applicant throughout this text, and is offered for use in claim interpretation.

The term "anthraquinone compound" is defined to include anthraquinone compounds comprising the basic tricyclic structure shown below, and including anthraquinone compounds substituted with up to four simple halogen, carboxyl, hydroxyl, or amino substituents. We do not include tetracyclines or sulfonated anthraquinones exemplified by the reactive dyes.

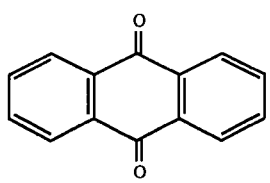

Typical compounds included within the scope of the invention, for example, include 1,8 diOH anthraquinone; 1 amino anthraquinone; 1 chloro anthraquinone; 2 chloro anthraquinone; 2 chloro-3carboxy anthraquinone; 1 hydroxy anthraquinone; and anthraquinone.

The term "methanogenic bacteria" refers to bacteria which have the ability to produce methane; including, but not limited to the genera Methanococcus, Methanobacterium, Methanosarcina, Methanobrevibacter, Methanothermus, Methanothrix, Methanospirillum, Methanomicrobium, Methanococcoides, Methanogenium.

The term "anaerobic digestor" refers to an apparatus used, for example, for the anaerobic conversion of municipal waste to methane and carbon dioxide. See, Renand, P., Dochain, D., Bostin, G., Naveau, H., Nyns, B-J., "Adaptive Control of Anaerobic Digestion Processes: A Pilot Scale Application", Biotechnol. Bioeng., 31:287:294 (1988) which is herein incorporated by reference.

The term "anaerobic digestor material" refers to material obtained, for example, from municipal waste treatment facilities such as that used herein, which is located in Wilmington, Del., and consisting of metabolizable organics, as well as microorganism such as fermentative clostridia, methanogenic bacteria, and sulfate-reducing bacteria. See, for example, "Anaerobic Treatment Technology for Municipal and Industrial Wastewater", M. S. Switzenbaum (Ed.), In: Water Science and Technology, Vol. 24, No. 8 1991).

The term "methanogenic bacteria medium" as used herein refers to any medium which permits growth of methanogenic bacteria. Specifically included are defined laboratory cultures, and also any other manmade or naturally occurring medium which permits methanogenic bacterial growth such as the anaerobic digestor material found in municipal waste treatment digestors; landfills; rice paddies; the rumen of ruminant animals; stagnant fresh water and marine ponds; or other naturally occurring or manmade anaerobic habitats.

A "ruminant animal" is one which derives it nutrition from the conversion of cellulose to volatile fatty acids. This occurs in a specialized area of the digestive system referred to as the rumen. See, for example, C. J. Van Nevel, D. I. Demeyer, "Manipulation of Rumen Fermentation", The Rumen Microbial Ecosystem, P. N. Hobson. (ed) Elsevier Publishing Co. (1988).

One embodiment of the invention involves contacting a methanogenic bacteria medium with anthraquinone compounds, either in single or in mixed culture, under conditions wherein a steady state level of hydrogen is present at less than 5% by volume. Under these conditions it is seen that levels of methane production are significantly reduced when compared to cultures without anthraquinones. Construction of a defined two-membered bacterial population comprising laboratory strains of the methanogen and a hydrogen-producing organism will also produce the desired conditions. A methanogenic, mixed culture enrichment obtained from a naturally-occurring source such as an anaerobic digestor will also create the desired conditions. The mixed methanogenic enrichment from an anaerobic digestor, or rumen source, most closely approximates these ecosystems in terms of microbiological makeup.

Pure cultures of methanogens may be readily obtained from any internationally accredited biological repository such as the American Type Culture Collection, Rockville, Maryland, USA (ATCC). An example of a pure strain of methanogen is M. formicicum corresponding to ATCC numbers 33274.

Typical samples of anaerobic digestor material may be obtained from waste treatment plants which utilize anaerobic digestors. Methanogens are routinely cultivated in pure culture in the laboratory by growing them in supportive medium under a gas phase comprising hydrogen/carbon dioxide in an 80%/20% vol/vol ratio under argon or nitrogen with sodium acetate. This growth condition does not approximate most conditions occurring in nature, but results in maximal growth rates and maximal cell densities. Samples of rapidly growing cultures maintained at these high levels of hydrogen may then be transferred to fresh medium and tested for growth at various hydrogen concentrations. It has been found that cultures must be grown at low concentrations of hydrogen commensurate with those found in nature (less than 5%) for the anthraquinone to function as an effective methane inhibitor.

Concentrations of hydrogen and methane produced from single or mixed cultures are determined by standard methods known in the art, wherein gas chromatography using Porapak® Q columns and argon carrier gas with thermal conductivity detection is preferred. Other suitable methods for hydrogen and methane measurement are described by Tadesse et al in J. Chromatogr., 171, 416, (1979) and Heidt et al., in J. Chromatogr., 69 (1), 103, (1972).

The anthraquinone compounds of the instant invention are to be distinguished from that broad group of anthraquinone-derived antibiotics, typified by adriamycin, for example, which has anthraquinone as a part of a much larger overall structure. The anthraquinones comprising the instant invention include the basic tricyclic structure show below, which may additionally be substituted with up to about four simple halogen, carboxyl, hydroxyl, or amino derivative substituents. Typical examples of effective compounds are seen in Table 12.

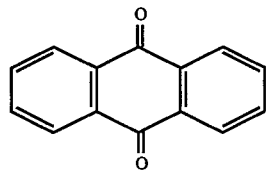

Generally, anthraquinones are not highly reactive but undergo reversible oxidation-reduction.

Preferred anthraquinones in this application comprise 9,10-dihyrdoanthraquinone, 1-amino anthraquinone, 1-chloroanthraquione, 2-chloroanthraquinone, 2-chloro-3-carboxyanthraquinone, 1-hydroxyanthaquinone and the unsubstituted anthraquinone; wherein the unsubstituted anthraquinone is most preferred. The anthraquinones found to be effective inhibitors are all readily available commercial chemicals and do not require any special preparation other than dissolution in a suitable medium.

There are several accepted methods of preparing the anthraquinones for delivery to the cultures. Finely divided particulate may be used for delivering anthraquinones into the bacterial growth medium for inhibition of methanogenesis. Also, some anthraquinones may be dissolved and added in liquid form. Water may be used to prepare aqueous suspensions or solutions and these suspensions or solutions are most preferred for in vivo application of the invention. However, organic solvents such as ethanol, methanol, dimethyl sulfoxide and acetone may also be used. These solvents will be the most preferred for experimental convenience in in vitro and laboratory applications. Of the organic solvents, acetone is the most preferred. Once dissolved in the appropriate solvent the anthraquinones may be added directly to the methanogenic bacteria medium.

Effective final concentration of the anthraquinones is in the range of 1–5 ppm (wt/vol=mg/1). It has been found that some anthraquinones are degraded by the bacteria present in anaerobic digestors, and thus, repeated applications of the compound(s) may be necessary in order to maintain the concentration of anthraquinone within the 1–5 ppm range.

The efficiency of feed utilization in domestic animals, especially the ruminants such as cattle and sheep, is of economic importance in the farming industry. It has been known for some time that compounds that inhibit methanogenesis in ruminant animals also play a role in feed utilization.

As an aid to discovering methods of increasing the efficiency of feed utilization in ruminants, studies of the biochemical mechanisms by which ruminants digest and degrade food, particularly carbohydrates, has been widely studied. It is now known that carbohydrates are degraded in the rumen to monosaccharides, which are converted to pyruvates, and then to acetates and propionates. Studies have shown that some of the rumen microbes ferment the monosaccharides of complex carbohydrates to formic, acetic, butyric and succinic acids, along with carbon dioxide and hydrogen. The carbon dioxide and hydrogen produced during fermentation are used in the formation of methane through the activity of methanogenic bacteria. These acetates, propionates and butyrates, collectively known as volatile fatty acids (or VTFA's), are all used as energy sources by ruminants. However, the conversion of pyruvates to acetates involves chain-shortening by one carbon atom, and this carbon atom is lost in the form of carbon dioxide which is then irreversibly converted to methane gas. Since the production of propionic acid does not result in a loss of carbon but rather the incorporation of carbon dioxide, the production of propionates from carbohydrates in the rumen of ruminant animals represents a more energy-efficient degradative pathway than the production of acetates and butyrates.

As a result, treatment of a ruminant so as to cause a shift in VTFA ratios in the rumen towards increased rumen propionic acid leads to a beneficial effect on ruminant growth for a given amount of food consumption. Consequently, by improving the efficiency of rumen fermentation, a corresponding increase in the rate of growth and/or an increase in the efficiency of feed utilization by the animals will occur. (See U.S. Pat. No. 4,876,367.)

For instance, feed utilization efficiency and/or rate of growth can preferably be improved by increasing the molar proportion of propionic acid to acetic acid or by increasing total volatile fatty acid concentration (i.e., the sum of acetic, propionic and butyric acids) in the rumen. In a similar fashion, it is also known that inhibiting methanogenesis in the rumen results in an apparent decrease in gaseous loss of methane via eructation and a shift toward producing more desirable fatty acids for growth, especially propionic and butyric acids. See U.S. Pat. Nos. 3,745,221; 3,615,649; and 3,862,333.

It is, therefore, a further object of the invention to provide compounds and method for the inhibition of methanogenesis in ruminant animals with the resulting beneficial effect of producing an increase in volatile fatty acids and an increase in feed utilization efficiency. The anthraquinones of the present invention when contacted with crude rumen bacterial cultures were seen to decrease the levels of methane produced and to shift volatile fatty acids production in favor of proprionate.

In one preferred embodiment, runimal fluid is extracted from a fistualted steer and a representative population of microorganisms is thereby obtained. Typically, a sample of rumen fluid is strained through cheesecloth and the eluate is collected. The particulate matter retained by the cheesecloth is resuspended in physiological buffer and the eluate is strained again. Buffers suitable for cell isolation are described by Cheng et al., *J. Dairy Sci.* 38, 1225 (1955). Eluates are pooled and allowed to stand until particulate matter separates to the top. The clear layer is then diluted with the same buffer, and adjusted to pH 7.0 for use in incubations.

Methods for the determination of volatile fatty acids are well known in the art. Typically, chromatographic methods such as HPLC or gas chromatography with flame ionization detection are preferred. Methods suitable for use in the present invention are described by Jen et al., in *J. Chromatogr.*, 629(2), 394, (1993) and Nakamachi et al., in *Kogyo Yosui*, (391), 36, (1991).

As has been mentioned above, there are several compounds commercially available that are known to enhance production of desirable volatile fatty acids in ruminant animals, most notably monensin and 2,2,dichloro acetamide. (See U.S. Pat. No. 3,839,557.) To test the effectiveness of anthraquinones on the production of desirable volatile fatty acids these compounds were used as positive controls in experiments where fatty acid production was analyzed.

The chemistry and microbiology of the rumen is complex and is affected by many factors, not the least of which is the dietary intake of fiber. The production of desirable volatile fatty acids is highly dependent on the presence of the appropriate ruminal microorganisms which are in turn affected by the components of dietary intake. It has been seen for example that ruminant microbial populations fluctuate broadly when sheep are fed diets of high-roughage containing corn meal and molasses, as compared with alfalfa hay. Mackie, *J. Agric. Sci.*, 103(1), 37, (1984). Allowing for the possibility that altered diets might impact methanogenesis and VTFA production, fistulated steers were fed diets of either alfalfa hay or 50:50 forage concentrate diet consisting of 50% alfalfa and 50% ground corn. It was seen that methane production was equally well inhibited under both dietary conditions, however, desirable VTFA production was only significantly increased in steers fed with the 50:50 forage concentrate diet.

As is well known in the art liberation of ammonia nitrogen is a measure of proteolysis and, when applied to the contents of the rumen, an indirect measure of the rate of digestion. During the analysis of VTFA production the liberation of ammonia nitrogen was tracked using a modified colorimetric assay involving phenolhypochlorite and read at a wavelength of 630 nm as described in Searcy et al., *Clinica Chem. Acta.*, 12, 170, (1965).

In order to be effective feed additives in the field, active compounds must not only be able to enhance desirable volatile fatty acid production and inhibit methanogenesis but also be free of inhibitory effects on the rate of fiber digestion. To determine whether the anthraquinones of the present application had any effects that would interfere with the digestive process, rates of digestion in the fistualted animals was determined by measuring the rate of digestion of acid detergent fiber (ADF).

Routine methods of analysis of ADF are generally based on the ADF sample being pretreated such that the other components are solubilized by chemical degradation ("crude fibre", Official Methods of AOAC, 1975, 136), or by treatment with wetting agents ("neutral detergent fiber/acid detergent fiber", van Soest and Wine, J. AOAC, 1967, 50, 50), or by enzymatic degradation (Weinstock and Benham, J. Cereal Chem., 1951, 28, 490; Hellendoorn et al., J. Sci, Food Agric., 1975, 26, 1461). Dietary fibres are then separated by filtration of the sample through a glass filter. Methods for determination of the rate of digestion using acid detergent fiber are well known in the art. (See for example, Goering et al., Forage Fiber Analysis. Agriculture Handbook #3, (1970), Agriculture Research Service, USDA, Washington, DC.)

The following nonlimiting examples are presented to illustrate several of the important aspects of the present invention. Since methanogens are commonly present at high levels in anaerobic digestor sludge and in the rumen of cows, these two distinct ecosystems were chosen to demonstrate the effect of anthraquinones on methane production in these systems. Additionally, defined mixed cultures of bacteria, including characterized methanogen strains, were investigated. The effect of anthraquinones on other nonmethanogenic reactions, including glucose fermentation to hydrogen, and lactic acid fermentation to hydrogen, were characterized; as well as the methanogenic conversion of glucose or lactate to methane and conversion of hydrogen plus carbon dioxide or acetate to methane.

EXAMPLES

Example 1

Methodology and Growth Conditions

A defined mineral medium of the following composition was used as a basal medium to which carbon and electron donors and electron acceptors were added depending on the desired growth condition. This basal medium is designated Medium BTZ-3 and is defined in Table 2.

TABLE 2

BTZ-3 Growth Medium

| Component | Concentration |
|---|---|
| Ammonium chloride | 4.3 g/l |
| Potassium dihydrogen phosphate | 0.5 g/l |
| Magnesium chloride hexahydrate | 0.20 g/l |
| Calcium chloride dihydrate | 0.10 g/l |
| HEPES buffer (1.0 M) | 50.0 ml |
| "Solution 1" | 10.0 ml |
| 0.2% Resazurin | 1.0 ml |
| Deionized water | 900 ml |

The chemical components of "Solution 1" are given in Table 3. (HEPES is N-[2-hydroxyethyl]piperazine-N'-[2-ethonesulfonic acid]. Resazurin is used as a redox indicator and is not an obligatory part of the medium.)

TABLE 3

"Solution 1"

| Component | Concentration |
|---|---|
| Nitrilotriacetic acid | 12.8 g/l |
| Ferrous chloride tetrahydrate | 0.3 g/l |
| Cuprous chloride dihydrate | 0.025 g/l |
| Manganous chloride tetrahydrate | 0.1 g/l |
| Cobaltous chloride | 0.32 g/l |
| Zinc chloride | 0.1 g/l |
| Boric acid | 0.01 g/l |
| Sodium molybdate | 0.01 g/l |
| Nickel chloride | 0.184 g/l |
| Deionized water | 1000 ml |
| Adjust pH to 7.0 with 1M NaOH. | |

To prepare the BTZ-3 medium the components of Table 2 were mixed in a round bottom flask and boiled under argon. The medium was then reduced by adding 40 ml of reducing agent to hot medium under argon. The reducing agent consisted of 0.2N NaOH (1.6 g in 200 ml water) in combination with sodium sulfide nonhydrate (2.5 g/200 ml) and cysteine hydrochloride (2.5 g/200 ml). 20 drops of 1M HCL were added and the pH was adjusted to pH 6.8–7.0. The medium was then dispensed into growth tubes or bottles, and argon gassing was continued in both growth containers and the medium. The medium was then sterilized by autoclaving for 20 minutes at 115° C.

The reducing agent was prepared by boiling (0.2N) NaOH under argon, followed by cooling and adding sodium sulfide. After the sodium sulfide had dissolved cysteine hydrochloride was added and permitted to dissolve. The reducing agent was then dispensed under argon at 10 ml per tube and autoclaved for 20 minutes at 115° C.

Modifications to BTZ-3 were used, where noted, and usually consisted of one or more of the following: sodium acetate, sodium lactate, yeast extract (Difco Laboratories), hydrogen/carbon dioxide gas phase. All anthraquinones were added as 1000 ppm solutions in acetone with the exception of the 2-chloro, 3-carboxy anthraquinone which was added as a 20 mM aqueous solution.

Example 2

Anaerobic Digestor Enrichment Studies

This example demonstrates the effect of the anthraquinones (AQ) 1,8-dihydroxyanthraquinone, 9,10-dihydroanthraquinone, and 2-chloroanthraquinone on fermentative and methanogenic stages of the anaerobic breakdown of lactate (column A) or glucose (column B) to methane in anaerobic digestor sludge. This example investigated the following stages of digestion:

1) The fermentation of glucose to hydrogen, acetate and carbon dioxide.
2) The fermentation of lactate to hydrogen, acetate and carbon dioxide.
3) The fermentation of glucose to hydrogen, acetate, carbon dioxide and methane.
4) The fermentation of lactate to hydrogen, acetate, carbon dioxide and methane.

Anaerobic digestor sludge was obtained from the Wilmington, DE waste treatment facility and was enriched on glucose or lactate amended media for subsequent experiments. All media were amended with 0.05% yeast extract. After a preculture period of 24 hours, a 10% inoculum of the preculture was transferred to the modified medium to start the experiment. For this Example, the "Lactate, Column A" represents 30 mM sodium lactate in the BTZ-3 grown medium. The "Glucose, Column B" represents 10 mM glucose in the BTZ-3 growth medium.

1,8-dihydroxyanthraquinone, 9,10-dihydroanthraquinone, or 2-chloroanthraquinone were then added to the cultures at the four different concentrations indicated in Table 4, and incubated for four hours. The hydrogen and methane produced per hour in the culture were measured by gas chromatography using Porapak® Q columns and argon carrier. Thermal conductivity detection was used. Results are given in Tables 4–6.

TABLE 4

AO is 2-chloroanthraquinone

| | umol H$_2$/h/culture | | nmol methane/h/culture | |
|---|---|---|---|---|
| AO in uM | A Lactate | B Glucose | A Lactate | B Glucose |
| 0 | 2.1 | 5.7 | 360 | 50 |
| 3.5 | 2.3 | 5.4 | 160 | 12 |
| 7 | 2.3 | 6.1 | 79 | 0 |
| 17.5 | 1.7 | 5.8 | 0.3 | 0 |

TABLE 5

AO is 1,8-dihydroxyanthraquinone

| | umol H$_2$/h/culture | | nmol methane/h/culture | |
|---|---|---|---|---|
| AO in uM | A Lactate | B Glucose | A Lactate | B Glucose |
| 0 | 1.8 | 4.7 | 285 | 43 |
| 3.5 | 1.8 | 5.6 | 326 | 12 |
| 7 | 1.9 | 5.4 | 206 | 0 |
| 17.5 | 1.6 | 3.6 | 0.6 | 0 |

TABLE 6

AO is 9,10-dihydroxyanthraquinone

| | umol H$_2$/h/culture | | nmol methane/h/culture | |
|---|---|---|---|---|
| AO in Mm | A Lactate | B Glucose | A Lactate | B Glucose |
| 0 | 1.45 | 6.2 | 320 | — |
| 3.5 | 2.1 | 6.2 | 295 | 39 |
| 7 | 2.1 | 5.9 | 97 | 43 |
| 17.5 | 2.2 | 4.2 | 26 | 0 |

This data demonstrates the general lack of effect of 2-chloroanthraquinone, 1,8-dihydroxyanthaquinone, or the unsubstituted 9,10-dihydroanthraquinone on fermentation of either lactate or glucose to hydrogen. Methane formation from either lactate or glucose is, however, almost completely inhibited at 17.5 uM by all three anthraquinones. This suggests that inhibition occurs at the point of methane formation from hydrogen and carbon dioxide or acetate (by methanogenic bactiera), and not at the point of hydrogen or acetate formation (by fermentative organisms).

Example 3

Conditions for Methane Inhibition

The object of Example 3 was to examine the effect of 2-chloroanthraquinone on methane formation from hydrogen and carbon dioxide or acetate while varying the concentration of hydrogen over the cultures.

Methane formation was investigated in anaerobic digestor enrichments by first preculturing anaerobic digestor sludge in BTZ-3 medium supplemented with 10 mM sodium acetate under H$_2$/CO$_2$ (80/20 vol/vol). A portion of this preculture was then transferred to fresh medium, (which had not been supplemented with acetate H$_2$/CO$_2$) to achieve inoculation of 10% vol/vol. 2-chloroanthraquinone ("AQ") was added to these test cultures at the concentrations indicated in Table 7, and the cultures were subjected to a series of 0.5% to 80% hydrogen concentrations. Initial rates of methane formation from the culture were determined (gas chromatography, Porapak Q column, argon carrier, thermal conductivity detection). The results are given below in Table 7.

TABLE 7

| | nmol methane/h/culture | | | | |
|---|---|---|---|---|---|
| AQ in um | 0.5% H$_2$ | 2% H$_2$ | 5% H$_2$ | 40% H$_2$ | 80% H$_2$ |
| 0 | 518 | 518 | 518 | 442 | 700 |
| 3.5 | 64 | 33 | 20 | 596 | 885 |
| 7 | 24 | 22 | 40 | 565 | 910 |
| 17.5 | 0 | 0 | 2 | 565 | 965 |

The effect of 2-chloroanthraquinone on methanogenesis from acetate in anaerobic digestor enrichments was also investigated. The procedure was performed as above, except that the test cultures all contained 30 mM sodium acetate. 2-chloroanthraquinone was added to the cultures at the different concentrations indicated in Table 8 and the production of methane was measured as above. The results are given below in Table 8.

TABLE 8

| AO in uM | nmol methane/h/culture |
|---|---|
| 0 | 60 |
| 3.5 | 79 |
| 7 | 26 |
| 14.5 | 0 |

The above data indicate that 2-chloroanthraquinone inhibits methanogenesis from both hydrogen (Table 7) or acetate (Table 8) substrate. However, with hydrogen as a methanogenic substrate, methane formation was inhibited only at low hydrogen concentrations (i.e., 0.5%, 2%, 5%) and not at 40% or 80% hydrogen. This inhibition was apparent at even the low concentration of AQ; 3.5 uM 2-chloroanthraquinone. Low ambient concentrations of hydrogen are typically found in anaerobic digestors or the rumen of cattle (C. J. Van Nevel, D. I. Demeyer, Manipulation of rumen fermentation. In: The Rumen Microbial Ecosystem, P. N. Hobson. (ed) Elsevier Publishing Co. (1988) and Renand, P., Dochain, D., Bostin, G., Naveau, H., Nyns, B-J., Adaptive control of anaerobic digestion processes: a pilot scale application, Biotechnol. Bioeng., 31:287:294 (1988).)

The other key methanogenic substrate in nature is acetate. Using acetate as a substrate, the 2-chloroanthraquinone was also found to inhibit methane formation as seen in Table 8.

Example 4

Rumen Methanogenesis Studies

Example 4 examined the effect of 2-chloroanthraquinone on methanogenesis by methanogenic bacteria using alfalfa as a carbon source, carried out by a rumen enrichment.

Fresh rumen fluid was obtained from a fistulated cow (a cow with a sampling point surgically implanted into the rumen compartment, obtained from University of Delaware, Dept. of Animal Science and Agricultural Biochemistry) and maintained at approximately 40° C. until inoculation into fresh medium in a ratio of 2:3 media:rumen fluid (vol:vol). The medium consisted of the basal mineral medium BTZ-3 (of Example 1) plus 0.38 g/l sodium chloride and 2.63 g/l sodium bicarbonate. 20 ml of this mixture was dispensed into 30 ml Wheaton bottles each containing 200 mg of finely divided alfalfa as the methanogenic substrate. The gas phase supplied was nitrogen/carbon dioxide 80/20 (vol/vol). The cultures were incubated at 40° C. with shaking. 2-chloroanthraquinone (AQ) was added at four different concentrations as indicated in Table 9, and the concentrations of methane, hydrogen, acetate and propionate were measured over time. Hydrogen and methane were monitored by intermittent sampling of the gas phase by gas chromatography (Porapak® Q column, argon carrier, thermal conductivity detection). Acetate and propionate were monitored by liquid sampling and high pressure liquid chromatography on a Hamilton Polypore H column with 0.013M sulfuric acid as the mobile phase. The results for the 21 hour time point are tabulated below in Table 9.

TABLE 9

μMols of Total Product Formed After 21 Hours

| Product | Control | 4 uM AO | 8 uM AO | 20 uM AO |
|---------|---------|---------|---------|----------|
| Hydrogen | 0.37 | 0.77 | 1.5 | 2.7 |
| Methane | 237 | 275 | 228 | 225 |
| Acetate | 549 | 511 | 526 | 460 |
| Propionate | 120 | 119 | 120 | 96 |

The data demonstrated only a marginal effect of 2-chloroanthraquinone over the range of 0–20 uM. An approximate 8-fold increase in hydrogen, and a small diminution of the acetate and propionate levels were seen. The increase in $H_2$ is a very sensitive indication of the onset of methane inhibition. Electrons are being diverted into $H_2$ production rather than for $CO_2$ reduction to methane. The experiment was repeated at 40 uM 2-chloroanthraquinone by subculturing the controls under the growth conditions described above. Again 200 mg of alfalfa per culture was added and the cultures incubated at 40° C. for 24 hours. The data for this experiment are shown below in Table 10.

TABLE 10 umols of Total Product Formed After 24 Hours

| Product | Control | 40 um (AO) |
|---------|---------|------------|
| Hydrogen | 50 | 225 |
| Methane | 174 | 2.5 |
| Acetate | 166 | 215 |
| Propionate | 200 | 151 |

The data at 40 uM (10 ppm) 2-chloroanthraquinone clearly demonstrate that methane formation is inhibited, as expected, while the unutilized hydrogen accumulates. There is a slight enhancement of acetate formation and some depression of propionate formation.

Example 5

Defined Mixed Culture Studies

Example 5 examined the effect of an equimolar 1-and 2-chloroanthraquinone mix on methane production by a defined mixed culture consisting of a sulfate-reducing bacterium *Desulfovibrio desulfuricans* WADS (source is Wilmington, Del. anaerobic digestion, "WADS") and a methanogen *Methanobacterium formicicum*. In this example both bacteria are present in a culture where lactate is serving as the carbon source. Although it is known that anthraquinones will inhibit sulfate reducing bacteria when growing as a result of sulfate reduction, here *Desulfovibrio desulfuricans* WADS is not growing by sulfate-reduction but rather by fermentation of lactate to hydrogen, and thus the chloroanthraquinones have no effect on the organism. In this culture, *Methanobacterium formicicum* is growing on hydrogen and carbon dioxide produced by the *D. desulfurican* to produce methane.

Lactate undergoes the following transformation as a result of metabolism by *Desulfovibrio desulfuricans:*

2 lactate→2 acetate+4 hydrogen+1 carbon dioxide and the resulting hydrogen is taken to methane and water by *Methanobacterium formicicum* according to the following scheme:

4 hydrogen+1 carbon dioxide→1 methane+2 water

The anthraquinone mix was added to these cultures as a solution in acetone, at the three different concentrations indicated in Table 11, and the levels of hydrogen and methane produced by the cultures were measured at daily intervals. The results appear in Table 11.

TABLE 11

Total uMol of $CH_4$ or H

| | Control | | AO at 0.05 ppm | | AO at 0.1 ppm | | AO at 0.2 ppm | |
|---|---|---|---|---|---|---|---|---|
| Days | $H_2$ | $CH_4$ | $H_2$ | $CH_4$ | $H_2$ | $CH_4$ | $H_2$ | $CH_4$ |
| 0 | 45 | 26 | 51 | 21 | 46 | 23 | 53 | 27 |
| 1 | 25 | 65 | 67 | 20 | 71 | 22 | 23 | 25 |
| 4 | 5 | 318 | 50 | 33 | 59 | 31 | 60 | 30 |
| 6 | 0.4 | 410 | 36 | 137 | 48 | 69 | 47 | 45 |
| 7 | 0.26 | 440 | 24 | 293 | 55 | 124 | 39 | 45 |
| 8 | 0.34 | 382 | 15 | 561 | 45 | 253 | 40 | 46 |

In the control cultures (no anthraquinones) hydrogen, generated by the sulfate-reducers, appears very rapidly at time zero and then disappears as it is converted to methane by the methanogen. This rapid hydrogen generation occurs in all cultures including the anthraquinone-treated ones. At 0.05 ppm AQ the conversion of hydrogen to methane by the methanogen is somewhat retarded, and hydrogen levels remain high in all cultures up to and including 0.2 ppm. It is also apparent that methane production is increasingly inhibited with increasing anthraquinone; and at the 0.2 ppm AQ level production of methane is almost completely diminshed.

Example 6

Effect of Different Anthraquinones

Example 6 investigated the effect of different anthraquinones on methanogenesis from anaerobic digestor sludge wherein lactate was provided as the electron and carbon source.

Anaerobic digestor enrichments were prepared with BTZ-3 medium containing sodium lactate at 30 mM essentially as described in Example 2. Anthraquinones were added as solutions in acetone at a concentration of about 20 mM and methane levels were measured as described previously, over time course indicated. The results are given in Table 12.

TABLE 12

| Anthraquinone | Total uMol Methane | | | | |
|---|---|---|---|---|---|
| | 0 hr | 16 hr | 36 hr | 56 hr | 64 hr |
| No AQ | 14 | 13 | 27 | 46 | 39 |
| 1,8 Di OH— | 11 | 10 | 12 | 12 | 11 |
| 1 Amino- | 11 | 15 | 13 | 14 | 14 |
| 1 Chloro- | 12 | — | 16 | 20 | 20 |
| 2 Chloro- | 11 | 14 | 14 | 11 | 17 |
| 2 Chloro- 3 Carboxy- | 17 | 16 | 28 | 29 | 29 |
| 1 Hydroxy- | 9 | 11 | 10 | 12 | 11 |
| Unsubstituted | 9 | 9 | 10 | 9 | 11 |

From the data it is evident that the addition of any anthraquinone derivative including the unsubstituted anthraquinone caused inhibition of methane formation. The 2 chloro- 3 carboxy anthraquinone was the weakest inhibitor. The data possibly suggests that the basic tricyclic ring structure is the component necessary for inhibition and that addition of, for example, simple chloro-, hydroxy-, or amino- substituents does not either enhance or destroy this activity.

Example 7

Effects of Anthraquinone Compounds on Methane Production and Volatile Fatty Acid Levels from Ruminal Microorganisms Isolated from Steers Fed on a 100% Forage Diet Alfalfa Hay Isolation of Microorganisms:

Runminal microorganism were isolated essentially as described in Example 4. Briefly, batch cultures of mixed ruminal microorganisms were established from a fistulated steer fed a diet comprised of 100% alfalfa hay (100% forage). The in vitro diet was ground through a 1 mm mesh screen and used at a rate of 0.375 g in 30 ml of culture fluid (15 ml of ruminal fluid and 15 ml of a standard ruminal buffer). Standard ruminal buffer is well known in the art and suitable examples may be found in Goering et al., *Forage Fiber Analysis. Agriculture Handbook #3*, (1970), Agriculture Research Service, USDA, Washington, DC. Ruminal fluid was collected 3 hours after feeding, strained through four layers of cheesecloth and processed to recover the particulate-bound microorganisms under anaerobic conditions.

Preparation of Anthraquinones and Control Compounds:

The compounds tested included 9,10 anthraquinone, 2 chloroanthraquinone and the 2 chloro-3 carboxy anthraquinone. Monensin (Sigma Chemical Co., St. Louis, Mo.) and 2,2 dichloroacetamide (2,2 DCA) (Aldrich Cehmical Co., Milwaukee, Wis.) are two compounds currently used commercially as feed additives for the purpose of methane inhibition and were used as positive controls. All compounds were solubilized in ethanol, and appropriate dilutions prepared such that 0.25 ml of solution yielded targeted concentrations (ppm in the culture fluid). Control cultures received 0.25 ml of ethanol alone. Data (not shown) from previous studies have shown minimal effects of this level of ethanol on rumen fermentation.

Incubation Conditions:

Incubations were performed anaerobically in 50 ml serum bottles maintained at 40° C. Three incubation replicates were prepared for each compound at each dose and incubations were typically for 24 hours.

Measurement of Gas and Volatile Fatty Acid Levels: After 24 hours of incubation total gas production was measured by displacement and gas samples taken for future analyses. pH was determined immediately, followed by addition of 1 ml of 25% m-phosphoric acid to 5 ml of fermentation fluid. The acidified fluid was analyzed for ammonia nitrogen colorimetrically using a modified phenolhypochlorite method and read at 630 nm essentially as described in Searcy et al., *Clinica Chem. Acta.*, 12, 170, (1965).

Volatile fatty acids were determined by gas chromatography (Model 589 Hewlett-Packard Avondale, Pa.) using a 10 meter, 530 um macrobore Carbowax® M column (Supelco Inc. Bellefonte, Pa.). Helium at a flow rate of 10 ml/min was the carrier gas. One microliter of sample was injected at 8:1 split ratio. Injection port temperature was 200° C. and detector temperature was 250° C. Oven temperature program was 0° C. for 1 min, 5° C./min increase to 100° C., 45° C./min to 170° C. with a final holding time of 5 minutes. Volatile fatty acids (VTFA) measured included acetic acid (C2), propionic acid (C3), isobutyric acid (Ci4), isovaleric acid ($C_i5$), and valeric acid (C5).

Methane and hydrogen were analyzed by intermittent sampling of the gas phase by gas chromatography (Porapak Q column, argon carrier, thermal conductivity detection). Initial oven temperature was 90° C. for 1 minute followed by 30° C./min until a final temperature of 190° C. was attained and held for 6 minutes. Argon was the carrier gas with a flow of 11 mV/min.

Effects of Anthraquinones on Gas and VTFA Production:

Table 13 shows the data collected from runminal microorganisms isolated from a fistulated steer fed on a forage diet, treated with various anthraquinone compounds, monesin and 2,2,dichloroacetamide.

TABLE 13

In vitro Effect of Anthraquinone Analogs, Monensin (M) and 2.2 Dicloro Acetamide (2.2 DA) on Ruminal Fermentation Pattern of a 100% Forage Diet Alfalfa Hay (Replicate 1)

| Treatment | | $C_2^1$ | $C_3$ | $C_i^4$ | $C_4$ | $C_i^5$ | $C_5$ | TVFA[2] | Methane[3] | Hydrogen[4] | NH3 mg/dl |
|---|---|---|---|---|---|---|---|---|---|---|---|
| Time 0 | | 40.02 | 8.80 | 0.65 | 3.51 | 0.96 | 0.75 | 54.69 | | | 11.46 |
| Control | | 85.57 | 18.22 | 1.10 | 8.02 | 1.60 | 1.91 | 116.42 | 189.98 | 2.39 | 21.93 |
| M | .5 ppm | 74.90 | 19.74 | 1.17 | 7.02 | 1.15 | 1.92 | 106.27 | 116.53 | 1.8 | 22.48 |
| 2,2 DA | .5 ppm | 79.91 | 17.57 | 1.05 | 8.11 | 1.51 | 1.84 | 109.99 | 111.51 | 1.56 | 21.89 |
| AQ1[5] | .5 ppm | 81.60 | 18.93 | 1.08 | 8.53 | 1.58 | 1.92 | 113.64 | 84.89 | 1.24 | 20.92 |
| | 1 ppm | 72.95 | 18.20 | 0.97 | 8.33 | 1.42 | 1.85 | 103.72 | 69.10 | 1.39 | 20.82 |
| | 5 ppm | 70.71 | 18.32 | 0.99 | 8.96 | 1.46 | 1.99 | 102.43 | 48.58 | 5.63 | 20.31 |

TABLE 13-continued

In vitro Effect of Anthraquinone Analogs, Monensin (M) and 2.2 Dicloro Acetamide (2.2 DA) on Ruminal Fermentation Pattern of a 100% Forage Diet Alfalfa Hay (Replicate 1)

| Treatment | | $C_2^1$ | $C_3$ | $C_i^4$ | $C_4$ | $C_i^5$ | $C_5$ | $TVFA^2$ | $Methane^3$ | $Hydrogen^4$ | NH3 mg/dl |
|---|---|---|---|---|---|---|---|---|---|---|---|
| $AQ2^6$ | .5 ppm | 73.70 | 17.82 | 0.94 | 7.96 | 1.37 | 1.79 | 103.58 | 92.59 | 1.53 | 20.70 |
| | 1 ppm | 69.92 | 20.82 | 0.85 | 8.68 | 1.27 | 1.96 | 103.50 | 31.72 | 7.6 | 22.19 |
| | 5 ppm | 72.55 | 19.66 | 1.04 | 8.35 | 1.56 | 1.95 | 105.11 | 45.01 | 10.04 | 21.31 |
| $AQ3^7$ | .5 ppm | 78.65 | 16.96 | 0.99 | 7.46 | 1.43 | 1.77 | 99.81 | 99.11 | 1.51 | 21.06 |
| | 1 ppm | 82.53 | 17.93 | 1.07 | 7.82 | 1.50 | 1.81 | 112.66 | 160.51 | 2.70 | 19.22 |
| | 5 ppm | 77.53 | 17.04 | 0.96 | 7.72 | 1.42 | 1.77 | 106.44 | 124.70 | 2.22 | 20.30 |

[1] mM of acetic (C2), propionic (C3), isobutyric ($Ci^4$), isovaleric ($C_i^5$), and valeric (5), acids.
[2] Total violatile fatty acids.
[3] uMoles of methane produced.
[4] uMoles of hydrogen produced.
[5] 2chloro anthraquinone.
[6] 9,10 anthraquinone.
[7] 3 chloro, 2 carboxy anthraquinine.

Table 13 shows that 9,10 anthraquinone, 2-chloroanthraquinone and the 2 chloro-3 carboxy anthraquinone all inhibited methane formation with the carboxylated derivative being least effective. Little effect was seen on hydrogen formation except at 5 ppm levels of the 9,10 anthraquinone. Acetate formation was suppressed by the 9,10 anthraquinone and 2 chloroanthraquinone. Only a slight elevation in propionate and butyrate levels was seen. Monensin, a commercial methane inhibitor (and propionate-enhancer) inhibited methane formation at 0.5 ppm but had only a marginal effect on fatty acids at this concentration. The same is observed for the rumen additive 2,2 dichloro-acetamide. Total volatile fatty acid production appears to be very slightly suppressed in most treated incubations relative to untreated controls.

The data shown here demonstrate that with a forage diet (alfalfa hay) there is a definite inhibition of methane formation by 0.5 to 5 ppm levels of the three anthraquinones tested with the unsubstituted and 2-chloro- denvatives being the best. Methane inhibition by the anthraquinones appears to be at least as good if not better than monensin or 2,2 dichloroacetamide. None of the compounds tested impacted volatile fatty acids significantly. There appears to be no discernible adverse effect of anthraquinones or the other compounds tested on proteolysis as indicated by the levels of free ammonia nitrogen determined in the incubation.

Example 8

Effects of Anthraquinone Compounds on Methane Production and Volatile Fatty Acid Levels from Ruminal Microorganism Isolated from Steers Fed on a 50:50 Forage Concentrate Diet Microorganisms were isolated exactly as described in Example 7 however, in this instance ruminal microorganisms were isolated from a fistulated steer fed a diet comprised 50:50 forage concentrate diet which was comprised of 50% alfalfa and 50% ground corn. Preparation of compounds, incubations and gas and VTFA measurements were done essentially as described in Example 7. Data demonstrating the effect of anthraquinones compounds on gas and VTFA production is given in Table 14.

TABLE 14

In Vitro Effect of Anthraquinone Analogs, Monensin (M) and 2.2 Dicloro Acetamide (2.2 DA) on Ruminal Fermentation Pattern of a 50:50 Forage:Concentrate Diet (replicate 1)

| Treatment | | $C_2^1$ | $C_3$ | $C_i^4$ | $C_4$ | $C_i^5$ | $C_5$ | $TVFA^2$ | $Methane^3$ | $Hydrogen^4$ | NH3 mg/dl |
|---|---|---|---|---|---|---|---|---|---|---|---|
| Time 0 | | 34.5 | 12.10 | 0.77 | 8.98 | 1.69 | 1.14 | 59.18 | | | |
| Control | | 66.70 | 20.78 | 1.00 | 18.66 | 2.20 | 2.47 | 111.85 | 286.09 | 4.36 | |
| M | .5 ppm | 63.73 | 35.69 | 0.82 | 15.69 | 2.06 | 2.46 | 120.45 | 150.69 | 7.25 | |
| 2,2 DA | .5 ppm | 65.83 | 30.11 | 1.08 | 20.79 | 2.26 | 2.75 | 122.82 | 152.31 | 6.15 | |
| $AQ1^5$ | .5 ppm | 67.15 | 30.38 | 1.11 | 20.94 | 2.31 | 2.79 | 121.89 | 185.42 | 4.20 | |
| | 1 ppm | 62.58 | 31.21 | 1.00 | 21.90 | 2.15 | 2.68 | 121.52 | 114.48 | 31.81 | |
| | 5 ppm | 56.86 | 29.80 | 0.87 | 25.84 | 1.95 | 2.85 | 118.17 | 56.41 | 138.14 | |
| $AQ2^6$ | .5 ppm | 69.15 | 31.05 | 1.11 | 21.80 | 2.31 | 2.79 | 128.21 | 177.75 | 4.12 | |
| | 1 ppm | 61.70 | 32.23 | 0.93 | 22.94 | 2.04 | 2.74 | 122.58 | 72.75 | 91.82 | |
| | 5 ppm | 55.96 | 30.54 | 0.85 | 25.53 | 1.91 | 2.80 | 117.59 | 13.33 | 217.29 | |
| $AQ3^7$ | .5 ppm | 75.83 | 28.02 | 1.13 | 20.67 | 2.37 | 2.62 | 130.64 | 244.75 | 3.31 | |
| | 1 ppm | 76.61 | 27.52 | 1.08 | 20.76 | 2.32 | 2.63 | 130.92 | 246.69 | 3.69 | |
| | 5 ppm | 72.30 | 25.60 | 1.01 | 21.74 | 2.23 | 2.60 | 125.48 | 237.09 | 3.14 | |

[1] mM of acetic (C2), propionic (C3), isobutyric ($Ci^4$), butyric (C4), isovaleric ($C_i5$), and valeric (5), acids.
[2] Total violatile fatty acids.
[3] uMoles of methane produced.
[4] uMoles of hydrogen produced.
[5] 2chloro anthraquinone.
[6] 9,10 anthraquinone.
[7] 3 chloro, 2 carboxy anthraquinine.

Table 14 shows the effect of anthraquinones, monensin and 2.2 dichloroacetamide on fermentation of a 50:50 mixture of hay:feedlot concentrate diet. This diet more closely approximates that to be used in actual application of rumen additives. Methane is clearly suppressed even at 0.5 ppm levels of the compounds tested with the exception of the carboxylated anthraquinone which showed only minimal impact on methane formation. In contrast to the 100% alfalfa incubations illustrated in Example 7, large accumulations of hydrogen were observed in the 9,10 anthraquinone or 2-chloro- treated incubations. Volatile fatty acids, particularly acetate, propionate and butyrate were clearly affected. Acetate formation was suppressed whereas propionate and butyrate formation were enhanced. These enhancements are favorable to the metabolism of the ruminant animals and may result in increased efficiency of growth. Ammonia nitrogen was not determined in these particular experiments. Long term adaptation of the culture to the excess production of hydrogen should, in theory result in enhanced propionate and butyrate formation since formation of these compounds requires reductant often in the form of hydrogen gas.

Example 9

Effect of Anthraquinones on Fiber Digestion

It is important that the experimental compounds not interfere with fiber digestion. Accordingly, 9,10 anthraquinone, 2 chloroanthraquinone, 2 chloro-3 carboxy anthraquinone, monensin and 2,2 dichloroacetamide were tested for their effect on fiber digestion of a feed comprised of 100% alfalfa.

Fiber digestion was measured after 24 hours of incubation by analyzing the feed residue for acid detergent fiber (ADF) content. Digestion of ADF was calculated by subtracting the residual ADF from the initial amount of ADF in the diet. Methods for calulcating Digestion of ADF are well knonw in the art and examples may be found in Goering et al., *Forage Fiber Analysis. Agriculture Handbook #3*, (1970), Agriculture Research Service, USDA, Washington, DC.

As shown in Table 15, percent digestion is slightly lower in most of the treated incubations. However there is no dose-response relationship apparent with any anthraquinone. Therefore, we conclude that there is no significant effect of anthraquinone on fiber digestion. Control substance was the solvent alone, used to dissolve the compounds of interest.

TABLE 15

| Compound | Concentration | % Digestion |
| --- | --- | --- |
| Control | 0 | 34% |
| Monensin | 0.5 ppm | 28% |
| 2,2 DCA | 0.5 ppm | 35% |
| 2-Chloro AQ | 0.5 ppm | 24% |
| 2-Chloro AQ | 1.0 ppm | 26% |
| 2-Chloro AQ | 5.0 ppm | 26% |
| 9,10 AQ | 0.5 ppm | 32% |
| 9,10 AQ | 1.0 ppm | 20% |
| 9,10 AQ | 5.0 ppm | 26% |
| 3-Chloro-2-Carboxy AQ | 0.5 ppm | 20% |

TABLE 15-continued

| Compound | Concentration | % Digestion |
| --- | --- | --- |
| 3-Chloro-2-Carboxy AQ | 1.0 ppm | 22% |
| 3-Chloro-2-Carboxy AQ | 5.0 ppm | 26% |

What is claimed is:

1. A method for increasing production of volatile fatty acids and inhibiting methane production in a ruminant animal, the method comprising feeding the ruminant animal an anthraquinone compound.

2. The method of claim 1 in which the ruminant animal is a cow.

3. The method of claim 2 in which the anthraquinone compound is unsubstituted anthraquinone.

4. The method of claim 1 in which the anthraquinone compound is selected from the group consisting of unsubstituted anthraquinone, 1-aminoanthraquinone, 1-chloroanthraquinone, 2-chloroanthraquinone, 2-chloro-3-carboxyanthraquinone, 1-hydroxyanthraquinone, and 9,10-dihydroanthraquinone.

5. The method of claim 4 in which the ruminant animal is a cow.

6. A method for increasing production of volatile fatty acids in a ruminant animal, said animal having a rumen and said rumen having a medium containing methanogenic bacteria, the method comprising contacting the medium in the rumen with an anthraquinone compound.

7. The method of claim 6 in which the anthraquinone compound is selected from the group consisting of unsubstituted anthraquinone, 1-aminoanthraquinone, 1-chloroanthraquinone, 2-chloroanthraquinone, 2-chloro-3-carboxyanthraquinone, 1-hydroxyanthraquinone, and 9,10-dihydroanthraquinone.

8. The method of claim 7 wherein the anthraquinone compound is present in the medium at a concentration of up to 1 mg/L.

9. The method of claim 7 in which the ruminant animal is a cow.

10. The method of claim 9 in which the anthraquinone compound is unsubstituted anthraquinone.

11. The method of claim 6 in which the ruminant animal is a cow.

12. The method of claim 6 in which the methanogenic bacteria are selected from the group consisting of Methanococcus, Methanobacterium, Methanosarcina, Methanobrevibacter, Methanotherms, Methanothrix, Methanospirllum, Methanomicrobium, Methanococcides, Methanogenium, and Methanoplanus.

13. The method of claim 12 wherein the anthraquinone compound is selected from the group consisting of unsubstituted anthraquinone, 1-aminoanthraquinone, 1-chloroanthraquinone, 2-chloroanthraquinone, 2-chloro-3-carboxyanthraquinone, 1-hydroxyanthraquinone, and 9,10-dihydroanthraquinone.

14. The method of claim 6 in which a level of hydrogen over the medium is less than 5% by volume.

15. The method of claim 6 in which an amount of the anthraquinone compound in the medium is sufficient to produce a concentration of up to 1 mg/L.

* * * * *